(12) United States Patent
Mruz

(10) Patent No.: US 7,248,458 B2
(45) Date of Patent: Jul. 24, 2007

(54) ORIENTATION-INSENSITIVE ULTRA-WIDEBAND COUPLING CAPACITOR AND METHOD OF MAKING

(75) Inventor: John Mruz, East Northport, NY (US)

(73) Assignee: American Technical Ceramics Corporation, Huntington Station, NY (US)

( * ) Notice: Subject to any disclaimer, the term of this patent is extended or adjusted under 35 U.S.C. 154(b) by 0 days.

(21) Appl. No.: 10/940,266

(22) Filed: Sep. 14, 2004

(65) Prior Publication Data

US 2005/0057886 A1 Mar. 17, 2005

(51) Int. Cl.
*H01G 4/005* (2006.01)
*H01G 4/228* (2006.01)
*H01G 4/06* (2006.01)

(52) U.S. Cl. .................. 361/303; 361/306.1; 361/311; 361/328

(58) Field of Classification Search .. 361/301.1–301.4, 361/303–305, 306.1, 306.2, 310–312, 328–330
See application file for complete search history.

(56) References Cited

U.S. PATENT DOCUMENTS

| 6,418,009 | B1 * | 7/2002 | Brunette ............... 361/306.3 |
| 6,816,356 | B2 * | 11/2004 | Devoe et al. ........... 361/309 |
| 6,831,824 | B1 * | 12/2004 | Devoe et al. ........... 361/306.1 |
| 6,944,009 | B2 * | 9/2005 | Nguyen et al. ......... 361/328 |

* cited by examiner

*Primary Examiner*—Eric W. Thomas
(74) *Attorney, Agent, or Firm*—Charles E. Baxley

(57) ABSTRACT

An orientation-insensitive ultra-wideband coupling capacitor. The orientation-insensitive ultra-wideband coupling capacitor includes a plurality of external surfaces, a low frequency portion, and a high frequency portion. The high frequency portion is so disposed on, and electrically connected to, the low frequency portion so as to allow the orientation-insensitive ultra-wideband coupling capacitor to work identically when mounted on any external longitudinal surface of the plurality of external surfaces thereof and thereby be readily SMT compatible without regard to special orienting procedures.

46 Claims, 7 Drawing Sheets

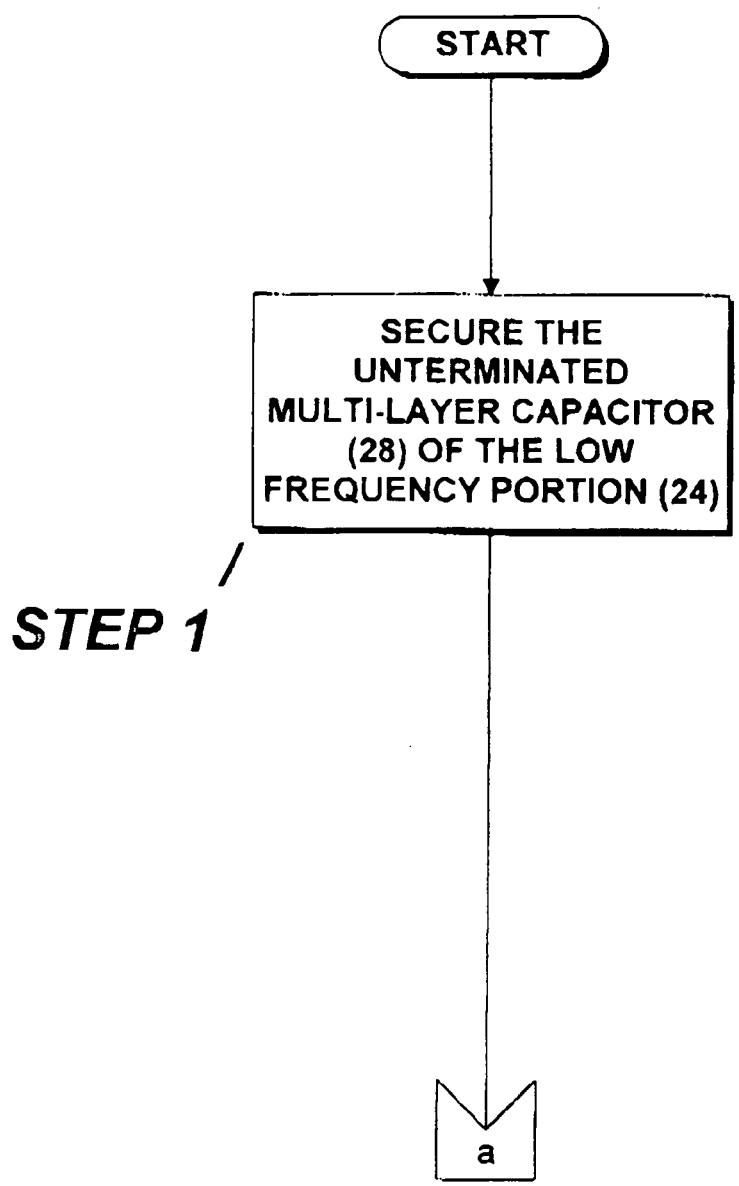
FIG. 7-A

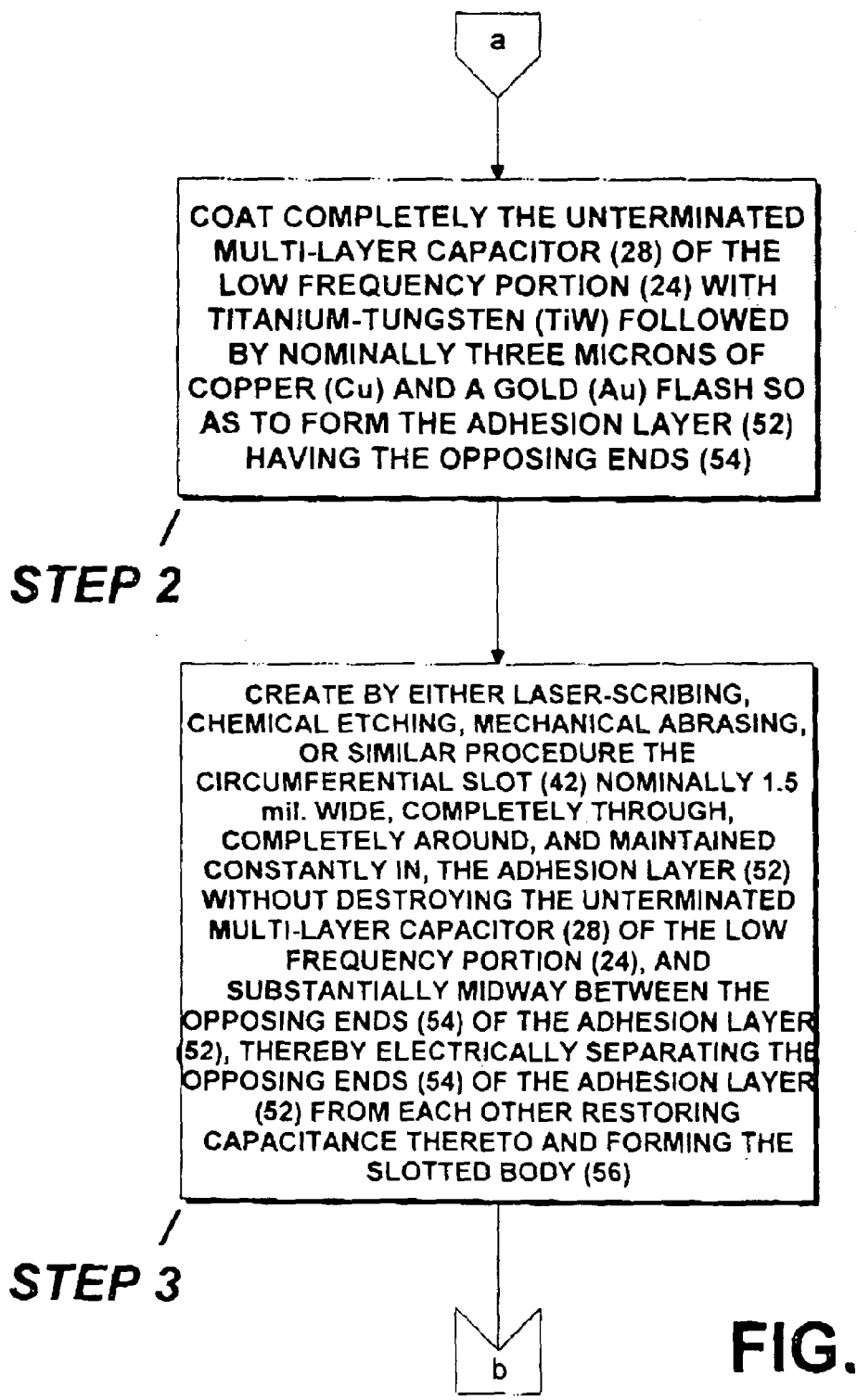
FIG. 7-B

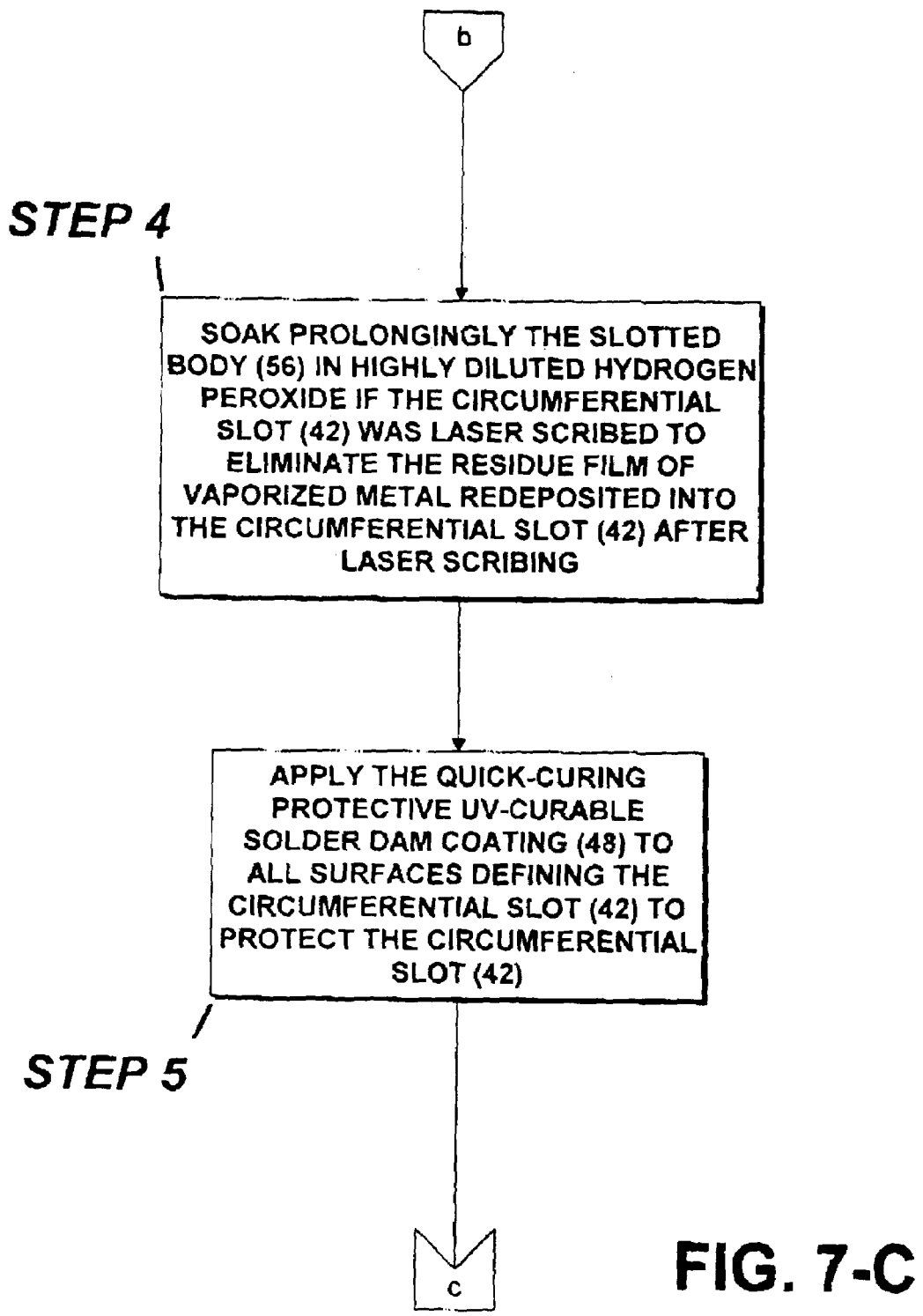

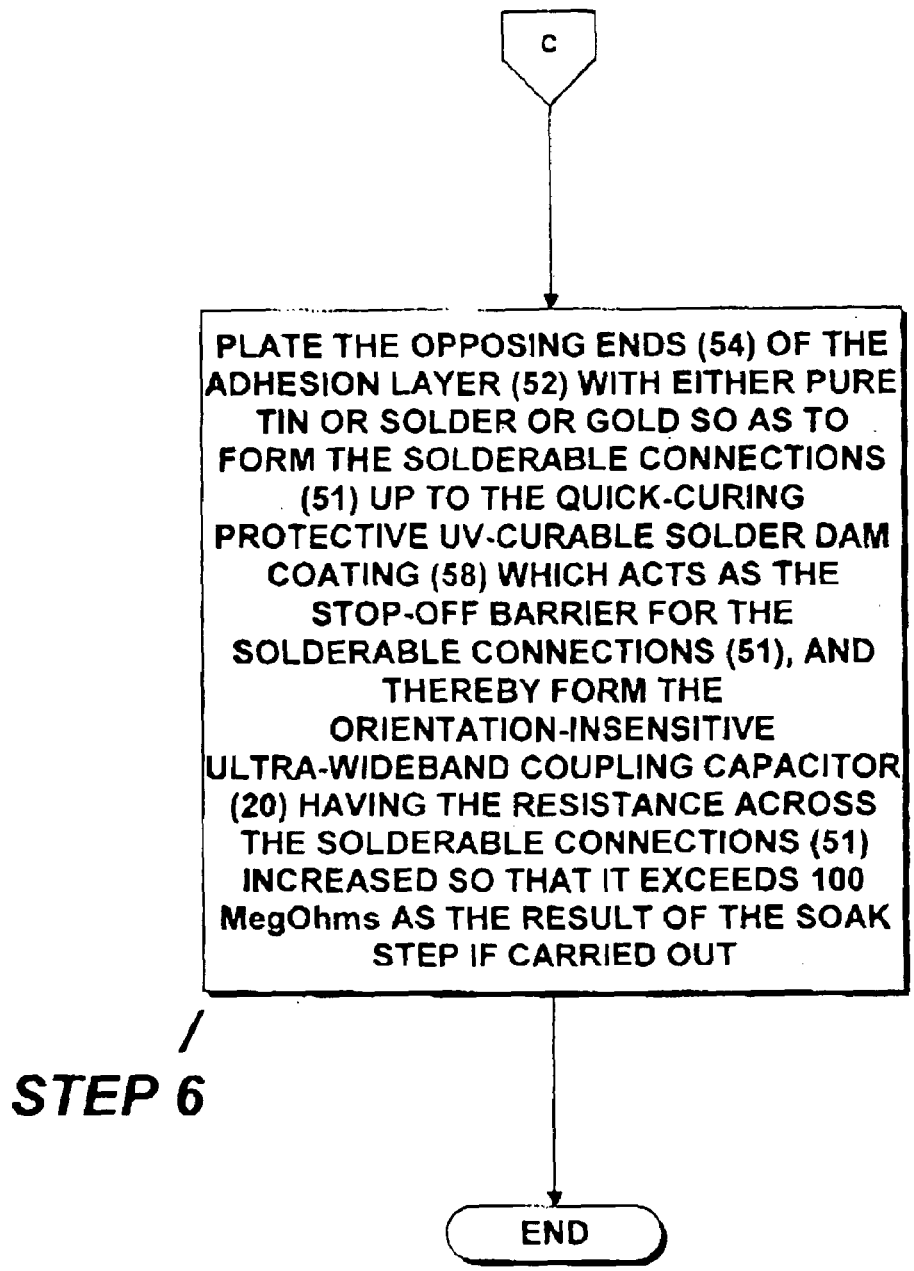
STEP 6
FIG. 7-D

ORIENTATION-INSENSITIVE ULTRA-WIDEBAND COUPLING CAPACITOR AND METHOD OF MAKING

BACKGROUND OF THE INVENTION

1. Field of the Invention

The present invention relates to an ultra-wideband coupling capacitor, and more particularly, the present invention relates to an orientation-insensitive ultra-wideband coupling capacitor and method of making.

2. Description of the Prior Art

As shown in FIGS. 1 and 2, which are, respectively, a schematic diagram of a prior art ultra-wideband coupling capacitor, and an exploded diagrammatic perspective view of a prior art ultra-wideband coupling capacitor, a prior art ultra-wideband coupling capacitor 10 is a parallel combination of a high value capacitor 12, typically 10 nanofarads or greater, and a low value capacitor 14, typically 20 picofarads to 250 picofarads. As can be seen, capacitors in parallel result in wider operating bandwidths.

The prior art ultra-wideband coupling capacitor 10 is either composed of two or more physical items which require precise assembly or a single ceramic assembly which must internally include complex multiple capacitor configurations, and via holes that interconnect internal electrodes to external contacting pads. Both of these family of devices have larger than desired physical footprints and can only be mounted on one specific side of the device making them difficult to use where surface mount technology (SMT) is employed. Electrically, size limitations result in both high insertion and return losses and also cause excessive surface moding at higher microwave frequencies.

The high value capacitor 12 is a multi-layer capacitor, while the low value capacitor 14 is generally either a single layer capacitor or two single layer capacitors in a balanced configuration. The multi-layer capacitor is a multi-layer structure with interdigitated plates, each separated by a thin dielectric layer, while the single layer capacitor is a single layer structure with two plates separated by a thin dielectric layer.

The high value capacitor 12, with its relatively low series resonance, is most effective on lower frequency signals, while the low value capacitor 14, with its relatively high series resonance, is most effective on high frequency signals.

The high value capacitor 12 and the low value capacitor 14 of the prior art ultra-wideband coupling capacitor 10 have different operating characteristics in different portions of an ultra-wideband operating spectrum, as will be discussed infra.

As shown in FIG. 3A, which is a schematic diagram of a prior art ultra-wideband coupling capacitor operating at a low frequency, when the prior art ultra-wideband coupling capacitor 10 is operating at a low frequency, the prior art ultra-wideband coupling capacitor 10 electrodes exhibit insignificant skin effect. The ceramic structure looks like a bulk dielectric.

As shown in FIG. 3B, which is a schematic diagram of a prior art ultra-wideband coupling capacitor operating at a mid frequency, when the prior art ultra-wideband coupling capacitor 10 is operating at a mid frequency, the prior art ultra-wideband coupling capacitor 10 electrodes exhibit significant skin effect. The dielectric region begins to take on the effect of a meandering parallel plate transmission line structure. Additional resonances emerge.

As shown in FIG. 3C, which is a schematic diagram of a prior art ultra-wideband coupling capacitor operating at a high frequency, when the prior art ultra-wideband coupling capacitor 10 is operating at a high frequency, the prior art ultra-wideband coupling capacitor 10 electrodes exhibit full skin effect. The dielectric region acts as a lossy meandering parallel plate transmission line. Additional resonances emerge at the higher frequencies.

The prior art ultra-wideband coupling capacitor 10 has a few associated shortcomings. Firstly, since the prior art ultra-wideband coupling capacitor 10 is a two-piece structure, the prior art ultra-wideband coupling capacitor 10 requires additional production assembly effort, which increases per unit cost. Secondly, the prior art ultra-wideband coupling capacitor 10 is orientation-sensitive restricting it to being mounted only on one specific surface, creating surface mount technology (SMT) compatibility issues. Thirdly, the assembly height of the prior art ultra-wideband coupling capacitor 10 exceeds the 0.020" dimension of a standard 0402 package by 0.012".

Thus, there exists a need for an ultra-wideband coupling capacitor which is one-piece and thereby eliminates additional production assembly effort which thereby decreases per unit cost, which is orientation-insensitive and thereby eliminates restricting it to being mounted only on one specific surface which thereby eliminates surface mount technology (SMT) compatibility issues, and which does not exceed the 0.020" dimension of a standard 0402.

Numerous innovations for high frequency capacitors have been provided in the prior art. Even though these innovations may be suitable for the specific individual purposes to which they address, they each differ in structure and/or operation and/or purpose from the present invention in that they do not present an ultra-wideband coupling capacitor which is one-piece and thereby eliminates additional production assembly effort which thereby decreases per unit cost, which is orientation-insensitive and thereby eliminates restricting it to being mounted only on one specific surface which thereby eliminates surface mount technology (SMT) compatibility issues, and which does not exceed the 0.020" dimension of a standard 0402.

FOR EXAMPLE, U.S. Pat. No. 5,576,926 to Monsomo has an assignee common with the instant application and presents a capacitor which has a superior ability to operate in the upper regions of the RF spectrum. The capacitor includes a planar electrode layer which is mounted between a pair of dielectric layers. The electrode layer generally is centered inwardly with respect to the dielectric layers leaving an outward margin of dielectric material. One of the dielectric layers has two spaced apart contact members, each having a different polarity from the other. The electrode layer is isolated from electrical contact with any conductor and is buried within the dielectric layers. The electrode layer, in combination with the dielectric layer on which the contact members are mounted and the contact members, allow development of a selected value of capacitance between the contact members. Providing trimmed contact members, as well as controlling their size and spacing, allow for convenient preselection of desired operative characteristics of the capacitor. The contact members could be positioned on a substrate to which a buried electrode is mounted.

ANOTHER EXAMPLE, U.S. Pat. No. 6,690,572 to Liebowitz teaches an SLC which has a thin brittle ceramic dielectric layer less than 0.0035 inches thick and as low as 0.0005 inches or less. Electrodes are thick and strong enough, either singly or together, to give the structure required physical strength for manufacture, handling, and usage. Electrodes are (1) a ceramic metal composite, (2) a porous ceramic infiltrated with metal or other conductive material, (3) a resin filled with metal or other conductive material, or (4) combinations of the above. The very thin and, in itself, fragile dielectric layer provides exceedingly high capacity per unit area with temperature stability and low losses. A 0.00001-inch thick dielectric of titanium dioxide is also used.

It is apparent that numerous innovations for high frequency capacitors have been provided in the prior art that are adapted to be used. Furthermore, even though these innovations may be suitable for the specific individual purposes to which they address, they would not be suitable for the purposes of the present invention as heretofore described, namely, an ultra-wideband coupling capacitor which is one-piece and thereby eliminates additional production assembly effort which thereby decreases per unit cost, which is orientation-insensitive and thereby eliminates restricting it to being mounted only on one specific surface which thereby eliminates surface mount technology (SMT) compatibility issues, and which does not exceed the 0.020" dimension of a standard 0402.

SUMMARY OF THE INVENTION

ACCORDINGLY, AN OBJECT of the present invention is to provide an orientation-insensitive ultra-wideband coupling capacitor that avoids the disadvantages of the prior art.

ANOTHER OBJECT of the present invention is to provide an orientation-insensitive ultra-wideband coupling capacitor which has improved electrical performance over that of the prior art.

STILL ANOTHER OBJECT of the present invention is to provide an orientation-insensitive ultra-wideband coupling capacitor which has more attractive physical/mechanical characteristics than that of the prior art YET ANOTHER OBJECT of the present invention is to provide an orientation-insensitive ultra-wideband coupling capacitor which is one-piece and thereby has inherently higher reliability and eliminates additional production assembly effort which thereby decreases per unit cost.

STILL YET ANOTHER OBJECT of the present invention is to provide an orientation-insensitive ultra-wideband coupling capacitor which is smaller than a two-piece prior art ultra-wideband coupling capacitor and thereby consumes less space and reduces the propensity to launch surface modes.

YET STILL ANOTHER OBJECT of the present invention is to provide an orientation-insensitive ultra-wideband coupling capacitor which is orientation-insensitive and thereby eliminates restricting it to being mounted only on one specific surface which thereby eliminates surface mount technology (S MT) compatibility issues, i.e., operates equally well regardless of the surface used to mount it.

STILL YET ANOTHER OBJECT of the present invention is to provide an orientation-insensitive ultra-wideband coupling capacitor which does not require special orientation during tape-and-reel loading.

YET STILL ANOTHER OBJECT of the present invention is to provide an orientation-insensitive ultra-wideband coupling capacitor which does not exceed the 0.020" dimension of a standard 0402 so as to form a true 0402 package which can be handled with standard SMT equipment.

STILL YET ANOTHER OBJECT of the present invention is to provide an orientation-insensitive ultra-wideband coupling capacitor which is electrically identical to a two-piece prior art ultra-wideband coupling capacitor.

YET STILL ANOTHER OBJECT of the present invention is to provide an orientation-insensitive ultra-wideband coupling capacitor which has lower insertion loss than a two-piece prior art ultra-wideband coupling capacitor.

STILL YET ANOTHER OBJECT of the present invention is to provide an orientation-insensitive ultra-wideband coupling capacitor which has better VSWR than a two-piece prior art ultra-wideband coupling capacitor.

YET STILL ANOTHER OBJECT of the present invention is to provide a volumetrically efficient means for enclosing a functional RF component within a gapped low-loss conductor pair, each of which surrounds the RF component on four sides and is co-terminal with it on a remaining two sides.

BRIEFLY STATED, STILL YET ANOTHER OBJECT of the present invention is to provide an orientation-insensitive ultra-wideband coupling capacitor. The orientation-insensitive ultra-wideband coupling capacitor includes a plurality of external surfaces, a low frequency portion, and a high frequency portion. The high frequency portion is so disposed on, and electrically connected to, the low frequency portion so as to allow the orientation-insensitive ultra-wideband coupling capacitor to work identically when mounted on any external longitudinal surface of the plurality of external surfaces thereof and thereby be readily SMT compatible without regard to special orienting procedures.

The novel features which are considered characteristic of the present invention are set forth in the appended claims. The invention itself, however, both as to its construction and its method of operation together with additional objects and advantages thereof will be best understood from the following description when read and understood in connection with the accompanying drawings.

BRIEF DESCRIPTION OF THE DRAWINGS

The figures of the drawings are briefly described as follows:

FIGS. 7A–7D are a flow chart of the method of making the orientation-insensitive ultra-wideband coupling capacitor of the present invention.

LIST OF REFERENCE NUMERALS UTILIZED IN THE DRAWINGS

Figure 1:
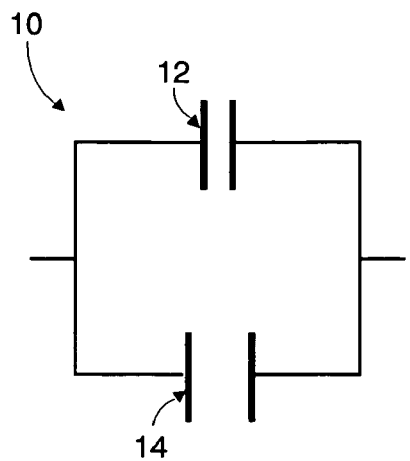
FIG. 1 is a schematic diagram of a prior art ultra-wideband coupling capacitor.
Figure 2:
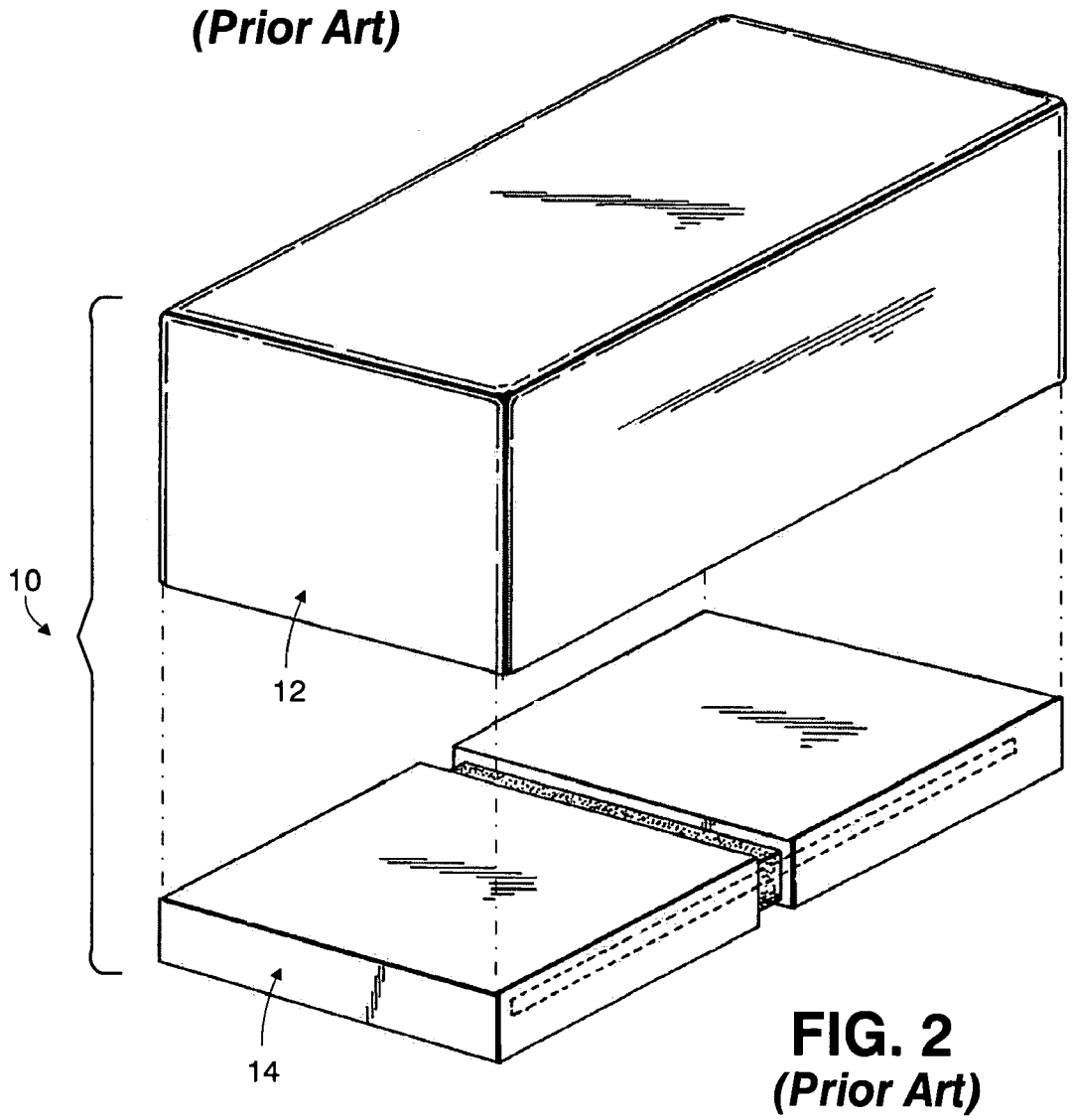
FIG. 2 is an exploded diagrammatic perspective view of a prior art ultra-wideband coupling capacitor.
Figure 3A:
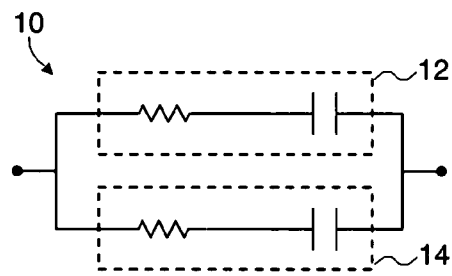
FIG. 3A is a schematic diagram of a prior art ultra-wideband coupling capacitor operating at a low frequency.
Figure 3B:
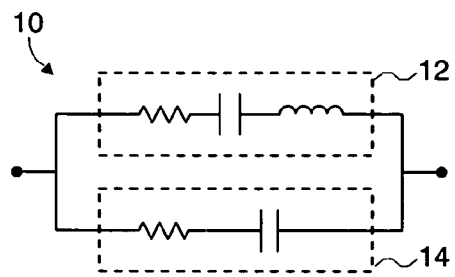
FIG. 3B is a schematic diagram of a prior art ultra-wideband coupling capacitor operating at a mid frequency.
Figure 3C:
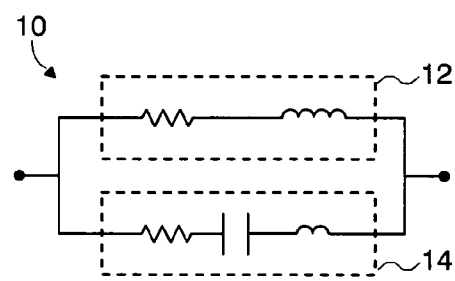
FIG. 3C is a schematic diagram of a prior art ultra-wideband coupling capacitor operating at a high frequency.

Prior Art 10 prior art ultra-wideband coupling capacitor
12 high value capacitor of prior art ultra-wideband coupling capacitor 10
14 low value capacitor of prior art ultra-wideband coupling capacitor 10

Present Invention 20 orientation-insensitive ultra-wideband coupling capacitor of present invention
22 plurality of external surfaces
24 low frequency portion
26 high frequency portion
28 unterminated multi-layer capacitor of low frequency portion 24
29 external surfaces of unterminated multi-layer capacitor 28 of low frequency portion 24
30 electrode layers of unterminated multi-layer capacitor 28 of low frequency portion 24
32 dielectric layers of unterminated multi-layer capacitor 28 of low frequency portion 24
34 first ends of electrode layers 30 of unterminated multi-layer capacitor 28 of low frequency portion 24
36 opposing ends of external surfaces 29 of unterminated multi-layer capacitor 28 of low frequency portion 24
38 second ends of electrode layers 30 of unterminated multi-layer capacitor 28 of low frequency portion 24
40 pair of conductors of high frequency portion 26
42 circumferential slot between pair of conductors 40 of high frequency portion 26
46 exposed opposing ends of plurality of external surfaces 22 of orientation-insensitive ultra-wideband coupling capacitor 20
48 quick curing protective UV-curable solder dam coating
50 plating
51 solderable connections
52 adhesion layer
54 opposing ends of adhesion layer 52
56 slotted body

DETAILED DESCRIPTION OF THE INVENTION

Figure 4:
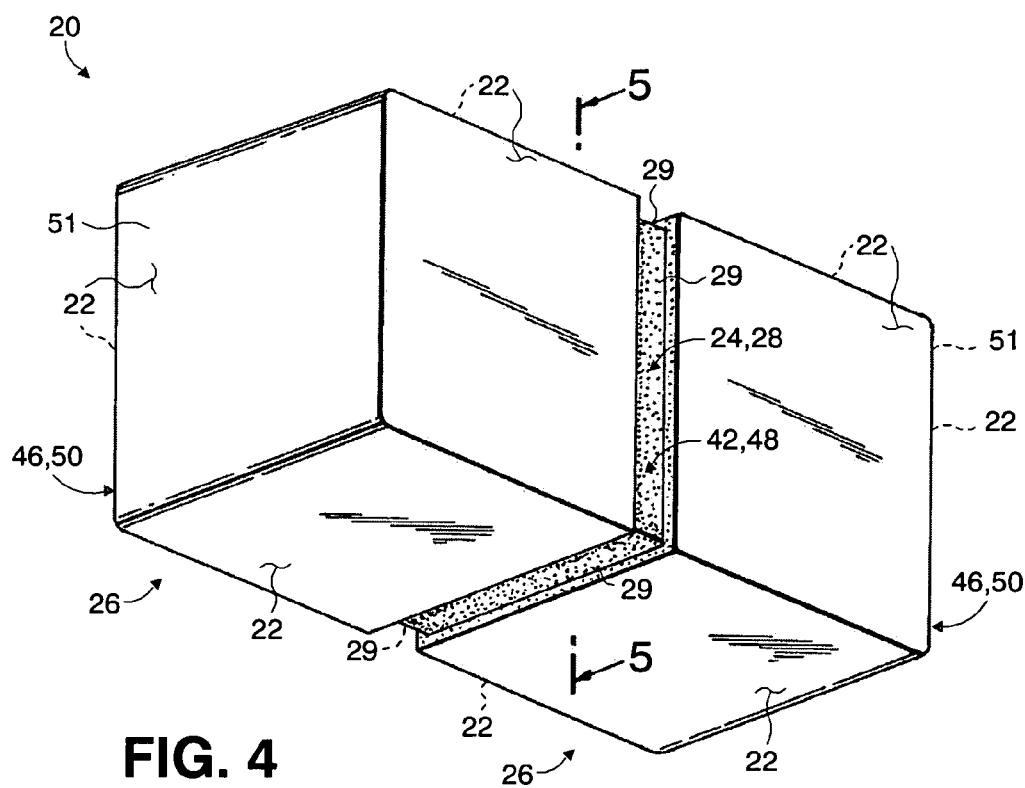
FIG. 4 is a diagrammatic perspective view of the orientation-insensitive ultra-wideband coupling capacitor of the present invention.
Figure 5:
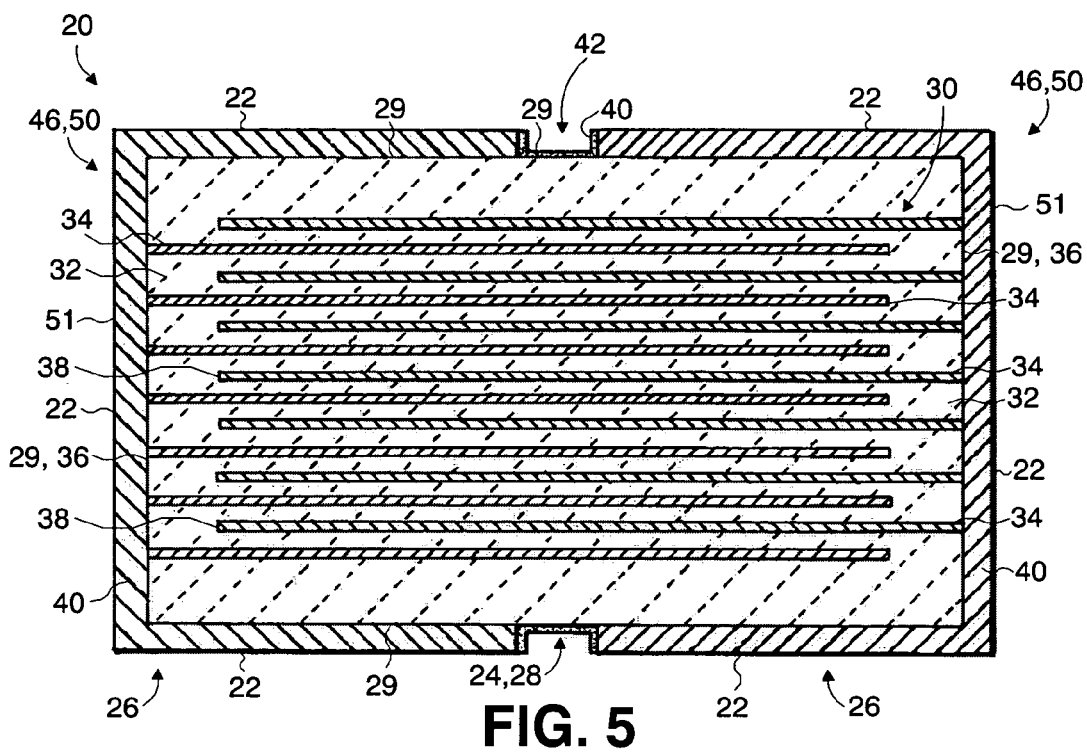
FIG. 5 is a diagrammatic cross sectional view taken along LINE 5—5 in FIG. 4.

Referring now to the figures, in which like numerals indicate like parts, and particularly to FIGS. 4 and 5, which are, respectively, a diagrammatic perspective view of the orientation-insensitive ultra-wideband coupling capacitor of the present invention, and a diagrammatic cross sectional view taken along LINE 5—5 in FIG. 4, the orientation-insensitive ultra-wideband coupling capacitor of the present invention is shown generally at 20.

The orientation-insensitive ultra-wideband coupling capacitor 20 typically operates in a range from below 20 KHz to over 40 Ghz, and fills a need for better blocking and decoupling components by finding a use in almost all ultra-wideband digital signal processing applications, e.g., optical systems and their associated test equipment, closely related DC returns and bias tees, fiber to the home (FTTH), and MMIC development, e.g., amplifiers, e.g, ultra-wideband MMIC amplifiers and those using related technology.

The orientation-insensitive ultra-wideband coupling capacitor 20 comprises a plurality of external surfaces 22, a low frequency portion 24, and a high frequency portion 26.

The high frequency portion 26 is so disposed on, and electrically connected to, the low frequency portion 24 so as to allow the orientation-insensitive ultra-wideband coupling capacitor 20 to work identically when mounted on any external longitudinal surface of the plurality of external surfaces 22 thereof and thereby be readily SMT compatible without regard to special orienting procedures.

The orientation-insensitive ultra-wideband coupling capacitor 12 can operate below 16 KHz by using a larger value for the low frequency portion 24 than that used for the range from below 20 KHz to over 40 Ghz, discussed supra.

The low frequency portion 24 is functionally equivalent to the high value capacitor 12 of the prior art ultra-wideband coupling capacitor 10, e.g., a multi-layer capacitor, while the high frequency portion 26 is functionally equivalent to the low value capacitor 14 of the prior art ultra-wideband coupling capacitor 10, e.g., a single-layer capacitor, so as to allow the orientation-insensitive ultra-wideband coupling capacitor 20 to have functions of both the high value capacitor 12 and the low value capacitor 14 solely in a single multi-layer ceramic body.

The low frequency portion 24 is an unterminated multi-layer capacitor 28 having external surfaces 29, electrode layers 30, and dielectric layers 32, and preferably being 10 nF or higher. The dielectric layers 32 of the unterminated multi-layer capacitor 28 of the low frequency portion 24 alternate with the electrode layers 30 of the unterminated multi-layer capacitor 28 of the low frequency portion 24. The electrode layers 30 of the unterminated multi-layer capacitor 28 of the low frequency portion 24 extend at first ends 34 thereof from, and are open for external electrical communication from, opposing ends 36 of the external surfaces 29 of the unterminated multi-layer capacitor 28 of the low frequency portion 24, to second ends 38 thereof which alternatingly stop short of the opposing end 36 of the external surfaces 29 of the unterminated multi-layer capacitor 28 of the low frequency portion 24 opposite to that from which they extend so as not to be open for external electrical communication therefrom.

The high frequency portion 26 is a pair of conductors 40. The pair of conductors 40 of the high frequency portion 26 cover the opposing ends 36 of the external surfaces 29 of the unterminated multi-layer capacitor 28 of the low frequency portion 24, respectively, and extend therefrom over the external surfaces 29 of the unterminated multi-layer capacitor 28 of the low frequency portion 24, to just short of each other so as to form a circumferential slot 42 therebetween and be separate from each other. The circumferential slot 42 is preferably formed by laser scribing, but can be formed by either chemical etching, mechanical abrasing, or any similar procedure. Because the high frequency portion 26 does not employ additional internal electrodes with separating layers, i.e., does not employ a composite internal interdigital electrode array as a single floating electrode that is coupled to the pair of conductors 40 of the high frequency portion 26, there is less insertion and return losses.

The pair of conductors 40 of the high frequency portion 26 form the plurality of external surfaces 22 and electrically communicate with the first ends 34 of the electrode layers 30 of the unterminated multi-layer capacitor 28 of the low frequency portion 24 associated therewith so as to allow the orientation-insensitive ultra-wideband coupling capacitor 20 to work identically when mounted on any external longitudinal surface of the plurality of external surfaces 22 thereof. A set of coupled transmission lines is formed on the plurality of external surfaces 22 between the pair of conductors 40 of the high frequency portion 26 and the electrode layers 30 contained in the unterminated multi-layer capacitor 28 of the low frequency portion 24 so as to allow low frequency energy to pass through the low frequency portion 24, which is centrally located, and to allow high frequency energy to pass through the high frequency portion 26, which is peripherally located.

The pair of conductors 40 of the high frequency portion 26 preferably comprise titanium-tungsten (TiW) followed by nominally three microns of copper (Cu) and a gold (Au) flash.

The circumferential slot 42 is preferably nominally 1.5 mil wide, is constantly maintained completely through and completely around the high frequency portion 26 without destroying the unterminated multi-layer capacitor 28 of the low frequency portion 24, and is disposed substantially midway between exposed opposing ends 46 of the plurality of external surfaces 22 of the orientation-insensitive ultra-wideband coupling capacitor 20, thereby electrically separating the exposed opposing ends 46 of the orientation-insensitive ultra-wideband coupling capacitor 20 from each other restoring capacitance thereto.

The orientation-insensitive ultra-wideband coupling capacitor 20 further comprises a quick curing protective UV-curable solder dam coating 48. The quick curing protective UV-curable solder dam coating 48 covers all surfaces defining the circumferential slot 42 to protect the circumferential slot 42.

The orientation-insensitive ultra-wideband coupling capacitor 20 further comprises a plating 50. The plating 50 covers the exposed opposing ends 46 of the plurality of external surfaces 22 of the orientation-insensitive ultra-wideband coupling capacitor 20 so as to form solderable connections 51 which extend up to the protective UV-curable solder dam coating 48 which acts as a stop-off barrier for the solderable connections 51. The orientation-insensitive ultra-wideband coupling capacitor 20 is thereby formed having a resistance across the solderable connections 51 increased so that it exceeds 100 MegOhms. The plating 50 is preferably either pure tin or solder or gold. When the plating 50 is gold, the solderable connections 51 can also be gold/ribbon bonded or epoxy bonded.

Figure 6:
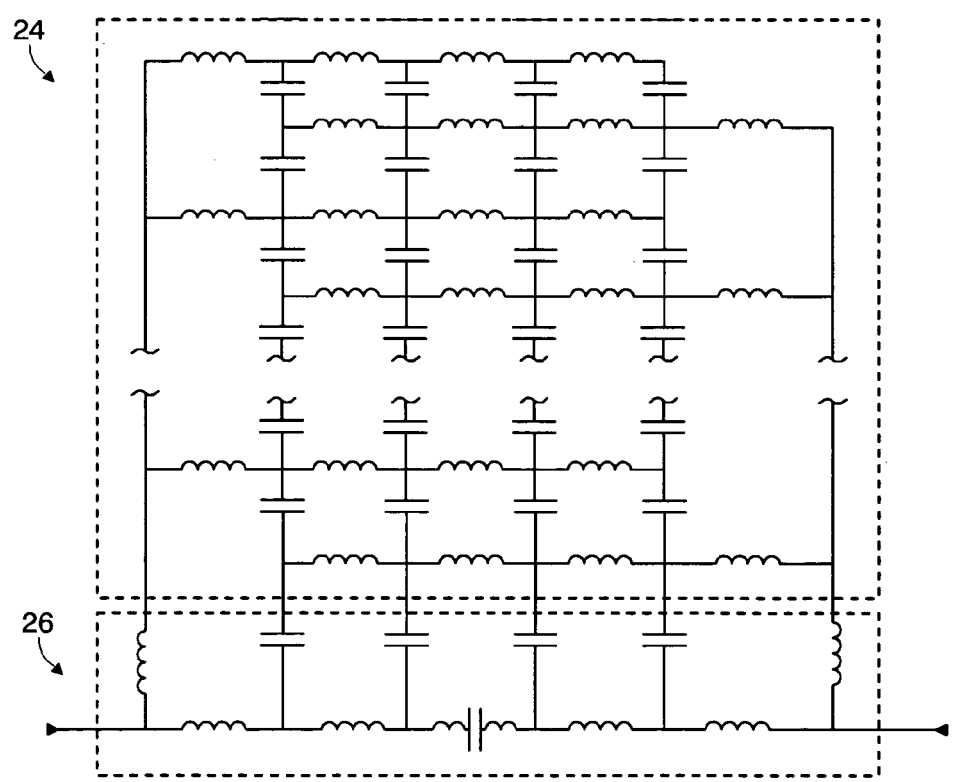
FIG. 6 is a circuit equivalent to the orientation-insensitive ultra-wideband coupling capacitor of the present invention.

A circuit equivalent to the orientation-insensitive ultra-wideband coupling capacitor 20 can best be seen in FIG. 6, which is circuit equivalent to the orientation-insensitive ultra-wideband coupling capacitor of the present invention.

The method of making the orientation-insensitive ultra-wideband coupling capacitor 20 can best be seen in FIGS. 7A–7D, which are a flow chart of the method of making the orientation-insensitive ultra-wideband coupling capacitor of the present invention, and as such, will be discussed with reference thereto.

The method of making the orientation-insensitive ultra-wideband coupling capacitor 20 comprises the following steps:

STEP 1: Secure the unterminated multi-layer capacitor 28 of the low frequency portion 24.

STEP 2: Coat completely the unterminated multi-layer capacitor 28 of the low frequency portion 24 with titanium-tungsten (TiW) followed by nominally three microns of copper (Cu) and a gold (Au) flash so as to form an adhesion layer 52 having opposing ends 54.

STEP 3: Create by either laser scribing, chemical etching, mechanical abrasing, or similar procedure the circumferential slot 42 nominally 1.5 mil wide, completely through, completely around, and maintained constantly in, the adhesion layer 52 without destroying the unterminated multi-layer capacitor 28 of the low frequency portion 24, and substantially midway between the opposing ends 54 of the adhesion layer 52, thereby electrically separating the opposing ends 54 of the adhesion layer 52 from each other restoring capacitance thereto and forming a slotted body 56.

STEP 4: Soak prolongingly the slotted body 56 in highly diluted hydrogen peroxide if the circumferential slot 42 was laser scribed to eliminate a residue film of vaporized metal redeposited into the circumferential slot 42 after laser scribing.

STEP 5: Apply the quick curing protective UV-curable solder dam coating 48 to all surfaces defining the circumferential slot 42 to protect the circumferential slot 42.

STEP 6: Plate the opposing ends 54 of the adhesion layer 52 with either pure tin or solder or gold so as to form solderable connections 51 up to the quick curing protective UV-curable solder dam coating 58 which acts as a stop-off barrier for the solderable connections 51, and thereby form the orientation-insensitive ultra-wideband coupling capacitor 20 having a resistance across the solderable connections 51 increased so that it exceeds 100 MegOhms as a result of the soak step if carried out. The plating 50 is preferably either pure tin or solder or gold.

It is to be understood that even though the embodiment given is for a low frequency capacitor within a high frequency capacitor, it is not limited to that combination, in that generically an embodiment includes a volumetrically efficient means for enclosing a functional RF component within a gapped low-loss conductor pair. Each of the pair of low-loss conductors surrounds the RF component on four sides and is co-terminal with the RF component on a remaining two sides. A gap formed between the conductor pair creates a low-loss capacitor that is in parallel with the surrounded RF component. The surrounded RF component may include, but is not limited to, either a multilayer capacitor, an inductor, a resistor, other resonance circuitry, a filter, a transmission line, or a plurality of transmission lines. The resultant overall device includes, but is not limited to, volumetrically efficient high-performing parallel combinations of two capacitors, of an inductor and capacitor creating thereby a parallel-resonant network, a resistor, other resonance circuitry and a capacitor or a so-called R-C network, a filter and a capacitor creating thereby a filter with an additional pole or coupling, a transmission line and a capacitor, or a plurality of transmission lines and a capacitor.

It will be understood that each of the elements described above, or two or more together, may also find a useful application in other types of constructions differing from the types described above.

The invention has been illustrated and described as embodied in an orientation-insensitive ultra-wideband coupling capacitor and method of making, however, it is not limited to the details shown, since it will be understood that various omissions, modifications, substitutions and changes in the forms and details of the device, materials employed and methods utilized, illustrated and its operation can be made by those skilled in the art according to knowledge in the art without departing from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An orientation-insensitive ultra-wideband coupling capacitor, comprising:
   a) a plurality of external surfaces;
   b) a low frequency portion; and
   c) a high frequency portion;
   wherein said high frequency portion is so disposed on, and electrically connected to, said low frequency portion so as to allow said orientation-insensitive ultra-wideband coupling capacitor to work identically when mounted on any external longitudinal surface of the plurality of external surfaces thereof.

2. The orientation-insensitive ultra-wideband coupling capacitor as defined in claim 1, wherein said orientation-insensitive ultra-wideband coupling capacitor operates in a range from below 20 KHz to over 40 GHz.

3. The orientation-insensitive ultra-wideband coupling capacitor as defined in claim 2, wherein said low frequency portion is functionally equivalent to a high value capacitor and said high frequency portion is functionally equivalent to a low value capacitor so as to allow said orientation-insensitive ultra-wideband coupling capacitor to have functions of both said high value capacitor and said low value capacitor solely in a single multi-layer ceramic body.

4. The orientation-insensitive ultra-wideband coupling capacitor as defined in claim 1, wherein said low frequency portion is functionally equivalent to a multilayer capacitor and said high frequency portion is functionally equivalent to a single layer capacitor so as to allow said orientation-insensitive ultra-wideband coupling capacitor to have functions of both said multilayer capacitor and said single layer capacitor solely in a single multi-layer ceramic body.

5. The orientation-insensitive ultra-wideband coupling capacitor as defined in claim 1, wherein said low frequency portion is an unterminated multi-layer capacitor;
   wherein said unterminated multi-layer capacitor of said low frequency portion has external surfaces;
   wherein said unterminated multi-layer capacitor of said low frequency portion has electrode layers;
   wherein said unterminated multi-layer capacitor of said low frequency portion has dielectric layers;
   wherein said dielectric layers of said unterminated multi-layer capacitor of said low frequency portion alternate with said electrode layers of said unterminated multi-layer capacitor of said low frequency portion; and
   wherein said electrode layers of said unterminated multi-layer capacitor of said low frequency portion extend at first ends thereof from, and are open for external electrical communication from, opposing ends of said external surfaces of said unterminated multi-layer capacitor of said low frequency portion, to second ends thereof which alternatingly stop short of said opposing ends of said external surfaces of said unterminated multi-layer capacitor of said low frequency portion opposite to that from which they extend so as not to be open for external electrical communication therefrom.

6. The orientation-insensitive ultra-wideband coupling capacitor as defined in claim 5, wherein said unterminated multi-layer capacitor of said low frequency portion is at least 10 nF.

7. The orientation-insensitive ultra-wideband coupling capacitor as defined in claim 5, wherein said high frequency portion is a pair of conductors;
   wherein said pair of conductors of said high frequency portion cover said opposing ends of said external surfaces of said unterminated multi-layer capacitor of said low frequency portion, respectively; and
   wherein said pair of conductors of said high frequency portion extend from said opposing ends of said external surfaces of said unterminated multi-layer capacitor of said low frequency portion, respectively, over said external surfaces of said unterminated multi-layer capacitor of said low frequency portion, to just short of each other so as to form a circumferential slot therebetween and be separate from each other.

8. The orientation-insensitive ultra-wideband coupling capacitor as defined in claim 7, wherein said pair of conductors of said high frequency portion form said plurality of external surfaces of said orientation-insensitive ultra-wideband coupling capacitor; and
   wherein said pair of conductors of said high frequency portion electrically communicate with said first ends of said electrode layers of said unterminated multi-layer capacitor of said low frequency portion associated therewith so as to allow said orientation-insensitive ultra-wideband coupling capacitor to work identically when mounted on any external longitudinal surface of said plurality of external surfaces thereof.

9. The orientation-insensitive ultra-wideband coupling capacitor as defined in claim 7, wherein a set of coupled transmission lines is formed on said plurality of external surfaces of said orientation-insensitive ultra-wideband coupling capacitor between said pair of conductors of said high frequency portion and said electrode layers contained in said unterminated multi-layer capacitor of said low frequency portion so as to allow low frequency energy to pass through said low frequency portion, which is centrally located, and to allow high frequency energy to pass through said high frequency portion, which is peripherally located.

10. The orientation-insensitive ultra-wideband coupling capacitor as defined in claim 7, wherein said pair of conductors of said high frequency portion comprise titanium-tungsten.

11. The orientation-insensitive ultra-wideband coupling capacitor as defined in claim 10, wherein said pair of conductors of said high frequency portion comprise copper; and
   wherein said copper of said pair of conductors of said high frequency portion is disposed on said titanium-tungsten of said pair of conductors of said high frequency portion.

12. The orientation-insensitive ultra-wideband coupling capacitor as defined in claim 11, wherein said copper of said pair of conductors of said high frequency portion is nominally three microns.

13. The orientation-insensitive ultra-wideband coupling capacitor as defined in claim 11, wherein said pair of conductors of said high frequency portion comprise a gold flash; and
   wherein said gold flash of said pair of conductors of said high frequency portion is disposed on said copper of said pair of conductors of said high frequency portion.

14. The orientation-insensitive ultra-wideband coupling capacitor as defined in claim 7, wherein said circumferential slot is constantly maintained in said high frequency portion;
   wherein said circumferential slot extends completely through said high frequency portion without destroying said unterminated multi-layer capacitor of said low frequency portion;
   wherein said circumferential slot extends completely around said high frequency portion; and
   wherein said circumferential slot electrically separates exposed opposing ends of said orientation-insensitive ultra-wideband coupling capacitor from each other restoring capacitance thereto.

15. The orientation-insensitive ultra-wideband coupling capacitor as defined in claim 14, wherein said circumferential slot is disposed substantially midway between said exposed opposing ends of said orientation-insensitive ultra-wideband coupling capacitor.

16. The orientation-insensitive ultra-wideband coupling capacitor as defined in claim 14; further comprising a quick curing protective UV-curable solder dam coating; and
   wherein said quick curing protective UV-curable solder darn coating covers all surfaces defining said circumferential slot to protect said circumferential slot.

17. The orientation-insensitive ultra-wideband coupling capacitor as defined in claim 16; further comprising a plating;
   wherein said plating covers said exposed opposing ends of said plurality of external surfaces of said orientation-insensitive ultra-wideband coupling capacitor so as to form solderable connections; and
   wherein said solderable connections extend up to said protective UV-curable solder dam coating which acts as a stop-off barrier for said solderable connections.

18. The orientation-insensitive ultra-wideband coupling capacitor as defined in claim 17, wherein said orientation-insensitive ultra-wideband coupling capacitor has a resistance across said solderable connections of at least 100 MegOhms.

19. The orientation-insensitive ultra-wideband coupling capacitor as defined in claim 17, wherein said plating is one of pure tin, solder, and gold.

20. The orientation-insensitive ultra-wideband coupling capacitor as defined in claim 7, wherein said circumferential slot is nominally 1.5 mil wide.

21. The orientation-insensitive ultra-wideband coupling capacitor as defined in claim 7, wherein the high frequency portion does not employ a composite internal interdigital electrode array as a single floating electrode that is coupled to said pair of conductors of said high frequency portion and thereby has less insertion and return losses.

22. The orientation-insensitive ultra-wideband coupling capacitor as defined in claim 1, wherein said high frequency portion does not employ additional internal electrodes with separating dielectric layers and thereby has less insertion and return losses.

23. The orientation-insensitive ultra-wideband coupling capacitor as defined in claim 1, wherein said orientation-insensitive ultra-wideband coupling capacitor operates below 16 KHz.

24. An improved ultra-wideband coupling capacitor of the type having a plurality of external surfaces, a low frequency portion, and a high frequency portion, wherein said improvement comprises:
   the high frequency portion being so disposed on, and electrically connected to, the low frequency portion so as to allow said improved ultra-wideband coupling capacitor to work identically when mounted on any external longitudinal surface of the plurality of external surfaces thereof.

25. The improved orientation-insensitive ultra-wideband coupling capacitor as defined in claim 24, wherein said improvement comprises said improved orientation-insensitive ultra-wideband coupling capacitor operating in a range from below 20 KHz to over 40 GHz.

26. The improved orientation-insensitive ultra-wideband coupling capacitor as defined in claim 24, wherein said improvement comprises the low frequency portion being functionally equivalent to a high value capacitor and the high frequency portion being functionally equivalent to a low value capacitor so as to allow said improved orientation-insensitive ultra-wideband coupling capacitor to have functions of both the high value capacitor and the low value capacitor solely in a single multi-layer ceramic body.

27. The improved orientation-insensitive ultra-wideband coupling capacitor as defined in claim 24, wherein said improvement comprises the low frequency portion being functionally equivalent to a multi-layer capacitor and the high frequency portion being functionally equivalent to a single layer capacitor so as to allow said improved orientation-insensitive ultra-wideband coupling capacitor to have functions of both the multi-layer capacitor and the single layer capacitor solely in a single multi-layer ceramic body.

28. The improved orientation-insensitive ultra-wideband coupling capacitor as defined in claim 24, wherein said improvement comprises the low frequency portion being an unterminated multi-layer capacitor;
   wherein said improvement comprises said unterminated multi-layer capacitor of the low frequency portion having external surfaces;
   wherein said improvement comprises said unterminated multi-layer capacitor of the low frequency portion having electrode layers;
   wherein said improvement comprises said unterminated multi-layer capacitor of the low frequency portion having dielectric layers;
   wherein said improvement comprises said dielectric layers of said unterminated multi-layer capacitor of the low frequency portion alternating with said electrode layers of said unterminated multi-layer capacitor of the low frequency portion; and
   wherein said improvement comprises said electrode layers of said unterminated multi-layer capacitor of the low frequency portion extend at first ends thereof from, and are open for external electrical communication from, opposing ends of said external surfaces of said unterminated multi-layer capacitor of the low frequency portion, to second ends thereof which alternatingly stop short of said opposing ends of said external surfaces of said unterminated multi-layer capacitor of the low frequency portion opposite to that from which they extend so as not to be open for external electrical communication therefrom.

29. The improved orientation-insensitive ultra-wideband coupling capacitor as defined in claim 28, wherein said improvement comprises said unterminated multi-layer capacitor of the low frequency portion being at least 10 nF.

30. The improved orientation-insensitive ultra-wideband coupling capacitor as defined claim 28, wherein said improvement comprises the high frequency portion being a pair of conductors;
   wherein said improvement comprises said pair of conductors of the high frequency portion covering said opposing ends of said external surfaces of said unterminated multi-layer capacitor of the low frequency portion, respectively; and
   wherein said improvement comprises said pair of conductors of the high frequency portion extending from said opposing ends of said external surfaces of said unterminated multi-layer capacitor of the low frequency portion, respectively, over said external surfaces of said unterminated multi-layer capacitor of the low frequency portion, to just short of each other so as to form a circumferential slot therebetween and be separate from each other.

31. The improved orientation-insensitive ultra-wideband coupling capacitor as defined in claim 30, wherein said improvement comprises said pair of conductors of the high frequency portion forming the plurality of external surfaces of the improved orientation-insensitive ultra-wideband coupling capacitor; and wherein said improvement comprises said pair of conductors of the high frequency portion electrically communicating with said first ends of said electrode layers of said unterminated multi-layer capacitor of the low frequency portion associated therewith so as to allow said improved orientation-insensitive ultra-wideband coupling capacitor to work identically when mounted on any external longitudinal surface of the plurality of external surfaces thereof.

32. The improved orientation-insensitive ultra-wideband coupling capacitor as defined in claim 30, wherein said improvement comprises a set of coupled transmission lines being formed on the plurality of external surfaces of said improved orientation-insensitive ultra-wideband coupling capacitor between said pair of conductors of the high frequency portion and said electrode layers containing said unterminated multi-layer capacitor of the low frequency portion so as to allow low frequency energy to pass through the low frequency portion, which is centrally located, and allow high frequency energy to pass through the high frequency portion, which is peripherally located.

33. The improved orientation-insensitive ultra-wideband coupling capacitor as defined in claim 30, wherein said improvement comprises said pair of conductors of the high frequency portion comprising titanium-tungsten.

34. The improved orientation-insensitive ultra-wideband coupling capacitor as defined in claim 33, wherein said improvement comprises said pair of conductors of the high frequency portion comprising copper; and wherein said improvement comprises said copper of said pair of conductors of the high frequency portion being disposed on said titanium-tungsten of said pair of conductors of the high frequency portion.

35. The improved orientation-insensitive ultra-wideband coupling capacitor as defined in claim 34, wherein said improvement comprises said copper of said pair of conductors of the high frequency portion being nominally three microns.

36. The improved orientation-insensitive ultra-wideband coupling capacitor as defined in claim 34, wherein said improvement comprises said pair of conductors of the high frequency portion comprising a gold flash; and wherein said improvement comprises said gold flash of said pair of conductors of the high frequency portion being disposed on said copper of said pair of conductors of the high frequency portion.

37. The improved orientation-insensitive ultra-wideband coupling capacitor as defined in claim 30, wherein said improvement comprises said circumferential slot being constantly maintained in the high frequency portion;

wherein said improvement comprises said circumferential slot extending completely through the high frequency portion without destroying said unterminated multi-layer capacitor of the low frequency portion;

wherein said improvement comprises said circumferential slot extending completely around the high frequency portion; and wherein said improvement comprises said circumferential slot electrically separating exposed opposing ends of said improved orientation-insensitive ultra-wideband coupling capacitor from each other restoring capacitance thereto.

38. The improved orientation-insensitive ultra-wideband coupling capacitor as defined in claim 37, wherein said improvement comprises said circumferential slot being disposed substantially midway between said exposed opposing ends of said improved orientation-insensitive ultra-wideband coupling capacitor.

39. The improved orientation-insensitive ultra-wideband coupling capacitor as defined in claim 37, wherein said improvement comprises a quick curing protective UV-curable solder dam coating; and wherein said improvement comprises said quick curing protective UV-curable solder dam coating covering all surfaces defining said circumferential slot to protect said circumferential slot.

40. The improved orientation-insensitive ultra-wideband coupling capacitor as defined in claim 39, wherein said improvement comprises a plating;

wherein said improvement comprises said plating covering said exposed opposing ends of said plurality of external surfaces of said improved orientation-insensitive ultra-wideband coupling capacitor so as to form solderable connections; and wherein said improvement comprises said solderable connections extending up to said protective UV-curable solder dam coating which acts as a stop-off barrier for said solderable connection.

41. The improved orientation-insensitive ultra-wideband coupling capacitor as defined in claim 40, wherein said improvement comprises said improved orientation-insensitive ultra-wideband coupling capacitor having a resistance across said solderable connection of at least 100 MegOhms.

42. The improved orientation-insensitive ultra-wideband coupling capacitor as defined in claim 40, wherein said improvement comprises said plating being one of pure tin, solder, and gold.

43. The improved orientation-insensitive ultra-wideband coupling capacitor as defined in claim 30, wherein said improvement comprises said circumferential slot being nominally 1.5 mil wide.

44. The improved orientation-insensitive ultra-wideband coupling capacitor as defined in claim 30, wherein said improvement comprises the high frequency portion not employing a composite internal interdigital electrode array as a single floating electrode that is coupled to said pair of conductors of said high frequency portion and thereby has less insertion and return losses.

45. The improved orientation-insensitive ultra-wideband coupling capacitor as defined in claim 24, wherein said improvement comprises the high frequency portion not employing additional internal electrodes with separating dielectric layers and thereby having less insertion and return losses.

46. The improved orientation-insensitive ultra-wideband coupling capacitory as defined in claim 24, wherein said improvement comprises said improved orientation-insensitive ultra-wideband coupling capacitory operates below 16 KHz.

* * * * *